March 3, 1964     W. R. CUSTER     3,123,321
AIRCRAFT CHANNEL WING PROPELLER COMBINATION
Filed Dec. 31, 1962     2 Sheets-Sheet 1

INVENTOR
WILLARD R. CUSTER
BY Raphael Semmes
ATTORNEY

March 3, 1964   W. R. CUSTER   3,123,321
AIRCRAFT CHANNEL WING PROPELLER COMBINATION
Filed Dec. 31, 1962   2 Sheets-Sheet 2

INVENTOR
WILLARD R. CUSTER

BY *Raphael Semmes*

ATTORNEY 3,123,321
AIRCRAFT CHANNEL WING PROPELLER
COMBINATION
Willard R. Custer, Hagerstown, Md., assignor to Custer Channel Wing Corporation, Hagerstown, Md., a corporation of Maryland
Filed Dec. 31, 1962, Ser. No. 248,746
8 Claims. (Cl. 244—12)

This invention relates to aircraft of the type including channel wings, such, for example, as disclosed in my prior Patents Nos. 2,510,959, 2,432,482 and 2,691,494, and consists more particularly in new and useful improvements in means for achieving a controlled relationship between the propeller tips and the trailing edge of the channel to meet varying conditions of take-off and flight.

With channel wing aircraft wherein the channel section is substantially a half venturi, the propeller is located usually adjacent the trailing edge of the channel, and under cruising conditions or when idling, it is desirable for the tip of the propeller to be spaced rearwardly of the trailing edge of the channel a distance of up to possibly six inches, which causes the air to move off the lower surface under the channel, as well as the top surface, under direct action of the propeller to provide a boundary layer control for both surfaces of the channel wing. However, under power and at take-off, it is desirable that this gap between the propeller tip and the trailing edge of the channel be closed to eliminate the movement of air under the channel by direct action of the propeller, while causing it to move off the top of the airfoil or out of the channel at greater velocity, deflecting the air downwardly as much as 45°. The closing of this gap permits the use of a greater part of the thrust, causing a high lift which coacts with the high lift of atmospheric pressure acting on the bottom surface of the channel because of the high velocity of air that is being taken out of the channel or over the surface.

It is therefore the primary object of the present invention to provide a channel and propeller combination including means for either automatically or mechanically varying the spacing of the propeller tip with respect to the trailing edge of the channel to meet varying flight and take-off requirements.

Another object of the invention is to provide in a combination such as above referred to, a flexible propeller blade, at least the tip portion of which is designed to deflect in spite of centrifugal force, from its normal operating position toward the channel at high r.p.m.'s and under power for take-off, hover and landings. This closes the gap between the trailing edge of the channel and the propeller tip and the propeller blade, being sufficiently flexible, to automatically return to its outward or normal operating position under reduced r.p.m.'s.

It should be pointed out that with a flexible propeller of this type, under power and at take-off, the propeller tip rotating at approximately 2700 r.p.m. causes a tremendous suction through the channel which, in spite of centrifugal force, deflects the tip of the propeller inwardly toward the trailing edge of the channel, opposing the tendency for the tip to straighten out by centrifugal force. In other words, it must be sufficiently flexible to deflect toward the channel in spite of centrifugal force and to return to its normal travelling position when the propeller is slowed down to cruise.

A further object of the invention is to provide a similar combination including a stiff propeller and means for automatically shifting the entire propeller either forward or aft with respect to the trailing edge of the channel to meet these varying flight requirements.

A still further object of the invention is to effect substantially this same result by providing a combination of a stiff propeller with a channel, wherein the latter is provided at its trailing edge with a shiftable extension designed to be automatically or mechanically moved forward or aft to close the gap between the channel and the propeller tip.

With the above and other objects in view which will appear as the description proceeds, this invention consists in the novel features herein set forth, illustrated in the accompanying drawings, and more particularly pointed out in the appended claims.

Referring to the drawings in which numerals of like character designate similar parts throughout the several views.

Figure 1:
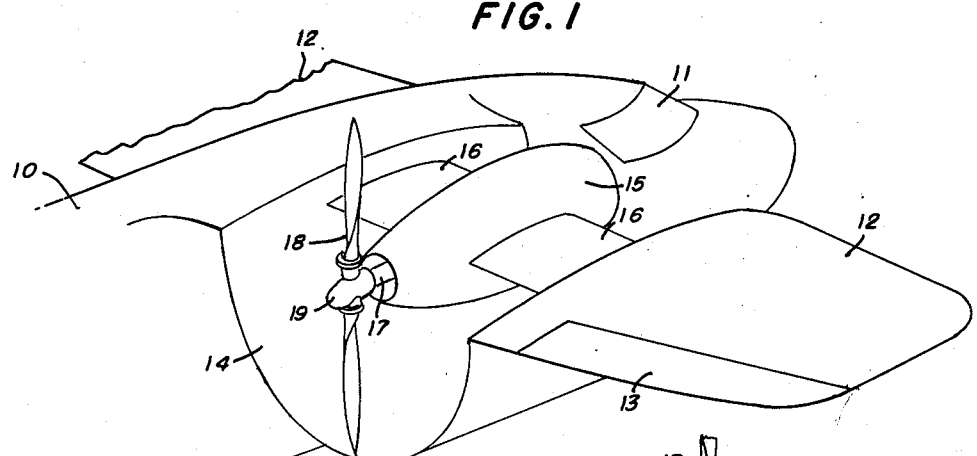
FIG. 1 is a perspective view which more or less diagrammatically illustrates the basic relationship of the propeller and channel wing of an aircraft.

In the drawings, referring first to FIG. 1 which is intended simply for orienting purposes, the numeral 10 designates the fuselage, forward of which is the usual cockpit 11, and extending laterally from the opposite sides of the fuselage are a pair of wings 12 having the usual outboard ailerons 13. The wings 12 are concave at their inboard extremities, and, together with the adjacent surfaces of the fuselage, form channels 14 generally similar to those disclosed in my said prior patents.

Within each channel 14 is a conventional power plant 15 supported by suitable braces 16 and driving a rearwardly projecting propeller shaft 17 which terminates aft of the trailing edge of the channel. A propeller 18 is fixed to the shaft 17 by a hub 19 and is arranged for rotation adjacent the trailing edges of the respective channels 14. The radius of each channel is slightly greater than the length of the respective propeller blades from hub to tip so as to provide rotary clearance of the blades, as will later appear.

Figure 2:
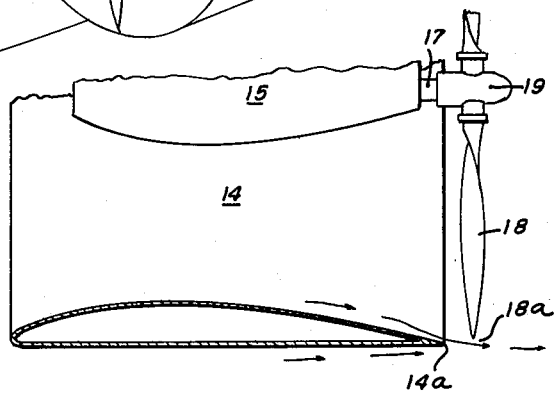
FIG. 2 is a fragmentary sectional view showing the spacing relationship of a flexible propeller and channel during idling or under cruising conditions.
Figure 3:
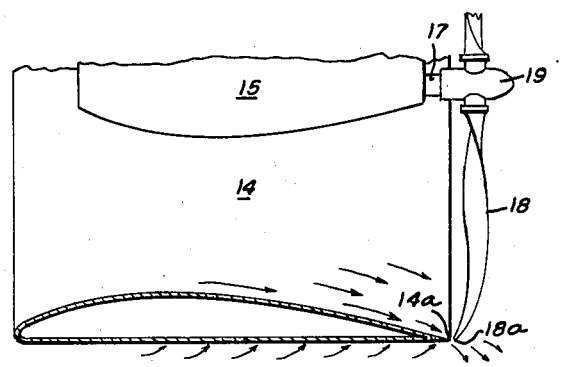
FIG. 3 is a similar view showing the flexible propeller tip deflected inwardly toward the channel at take-off and under hover and low speed landing conditions.

In the form of the invention shown in FIGS. 2 and 3, the propeller blade is formed of any suitable flexible material, such as laminated wood or plastic, and has sufficient flexibility to permit its tip 18a to be deflected forwardly under power and at take-off, as shown in FIG. 3, to substantially close the gap between said tip and the trailing edge 14a of the channel. As previously noted, when the propeller is rotating at high r.p.m.'s, a tremendous suction is created within the channel which, in spite of the normal tendency of centrifugal force to straighten out the propeller blades, deflects their tips forwardly into close proximity to the trailing edge of the channel. However, upon a reduction in r.p.m.'s, such as under cruise conditions, centrifugal force overcomes this suction and causes the propellers to return to their normal operating positions, spaced aft of the trailing edge of the channel, as shown in FIG. 2.

In this connection, it should be pointed out that it is desirable to construct the propeller so that the area thereof from approximately the 50% station out to the tip is scientifically graduated to lessen the stiffness, so that said portion will react in the above-described manner for closing the gap between the propeller tip and trailing edge of the channel under high propeller r.p.m.'s, and will automatically straighten out by strength of propeller design under low r.p.m.'s and when idling.

Thus, under cruise conditions, the tips of the blades gradually recede from the channels, providing a gap between the two, and at speeds of approximately 70 m.p.h. and up, the tips of the propellers will have practically resumed their standard relationship with respect to the propeller shaft, as shown in FIG. 2. With the propeller rotating at approximately 2400 r.p.m., the suction of the propeller induces the air to move off the lower surface under the channel, as well as the top surface, as seen by the arrows, giving a boundary layer control on both surfaces of the wing.

It is preferable that the propeller employed in this combination be constructed so that it has a gradual increase in pitch from the tip to the 25% station, corresponding to the digit number of the airfoil section in use in the channel, so that when the pitch is increased, the speed of the air over the airfoil will accelerate the velocity of air or the boundary layer to more than 100% faster than would be caused by the airfoil section in velocity, and quadruple the lift per square foot. It may also be noted that a propeller having a different airfoil section at each station, graduating from 100%, 75%, 50% and 25% to more efficiently increase the velocity of air through the channel at different positions from the channel surface to the center of the channel and the area above the engine nacelle tends to eliminate stall. A propeller with a short chord at the 100% station and a graduation to a long chord at the 25% station will effectively handle the high velocity of air at the throat of the channel to eliminate stall.

Figure 4:
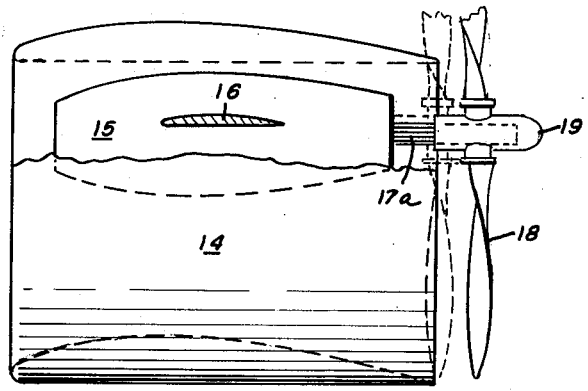
FIG. 4 is a fragmentary view showing a modification of the invention embodying a stiff propeller and wherein the propeller per se is shiftable forward and aft with respect to the trailing edge of the channel.

Another method of accomplishing this same general result may be attained by the use of stiff propellers of conventional design in an arrangement such as that illustrated in FIG. 4. In this embodiment of the invention, the propeller hub 19 may be internally fluted so as to be longitudinally slidable on a complementary fluted end 17a of the propeller shaft. This fore and aft shifting of the propeller and its hub may be accomplished in any one of various ways, either under the automatic control of hydraulic, electric or mechanical means manipulated by the pilot. It is believed unnecessary to illustrate any particular means for shifting the propeller, as this per se forms no part of the invention, and such means are known to the art.

Figure 5:
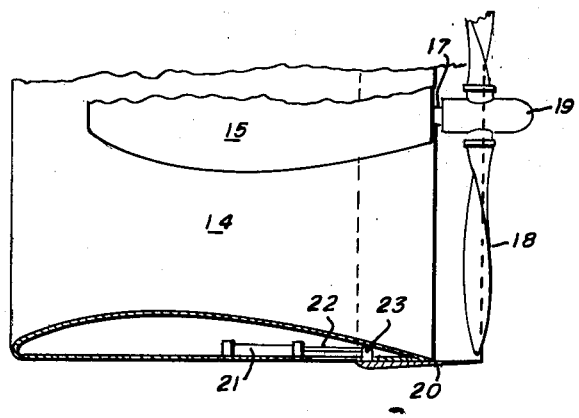
FIG. 5 is a fragmentary sectional view of a stiff propeller and a channel equipped with a shiftable extension, the latter being shown in its rearmost position in close proximity to the tip of the propeller.
Figure 6:
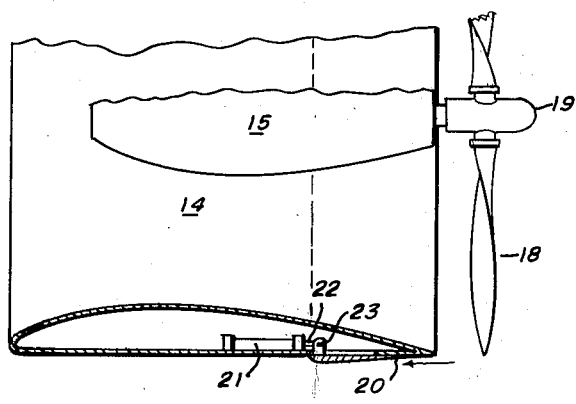
FIG. 6 is a similar view showing the shiftable extension in retracted or forward position.

Still another method of effecting the desired change of spacing of the propeller tips from the channels is shown in FIGS. 5 and 6, where, instead of shifting the propeller and its hub on the shaft 17, the trailing edge of the channel structure is provided with an extension which is rearwardly projectable and retractable with respect to the tips of the propeller. As shown in these figures, the rear end of each channel structure is provided with an arcuate extension 20 which slidably embraces the outer periphery of the channel structure at its trailing edge. The extension may be mounted by any suitable means, and its fore and aft shifting may be effected by any convenient mechanism, under the control of the pilot, such as by hydraulic systems 21, located at suitable spaced intervals around the channel and connected to the extensions by plunger rods 22 and lugs 23.

Thus, at take-off and hover, the extensions 20 may be projected as shown in FIG. 5 to produce the same effect as described in connection with FIG. 3, and at cruise speeds and when idling, these extensions may be retracted as shown in FIG. 6 to produce the same effect as described in connection with FIG. 2. It will be apparent that with any of the forms of the invention above described, the problem of boundary layer control under any speed conditions can be met.

From the foregoing, it is believed that the invention may be readily understood by those skilled in the art without further description, it being borne in mind that numerous changes may be made in the details disclosed without departing from the spirit of the invention as set out in the following claims.

I claim:

1. In an airplane wing; an upwardly-opening fore-and-aft-running channel portion and a propeller concentrically mounted to rotate adjacent the aft end of said channel; and means for varying the fore and aft spacing of at least the tip of said propeller from the trailing edge of said channel portion to compensate for varying channel airflow conditions resulting from varying propeller r.p.m.'s.

2. In an airplane wing; an upwardly-opening fore-and-aft-running channel portion and a propeller concentrically mounted to rotate adjacent the aft end of said channel so as to cause a degree of suction through said channel which increase with the speed of rotation of said propeller, the blades of said propeller being formed of a material providing the required flexibility to permit at least their tips to be deflected at high r.p.m.'s into close proximity to the trailing edge of said channels, in response to the resultant suction in said channel, and at lower r.p.m.'s to return to normal position under the action of centrifugal force.

3. The structure as claimed in claim 2, wherein said propeller blades are provided with flexible areas from the 50% station out to their tips.

4. In an airplane wing; an upwardly-opening fore-and-aft-running channel portion; and a propeller concentrically mounted to rotate adjacent the aft end of said channel; said propeller being shiftable longitudinally with respect to its shaft to vary the fore and aft spacing of its tip from the trailing edge of said channel portion.

5. In an airplane wing; an upwardly-opening fore-and-aft-running channel portion, and a propeller concentrically mounted to rotate in rearwardly spaced relation to the aft end of said channel portion; an extension slidably embracing the trailing edge of said channel, and means for projecting and retracting said extension longitudinally with respect to said trailing edge to vary the fore and aft spacing thereof with respect to the tip of said propeller.

6. The structure as claimed in claim 1, wherein the propeller has a gradual increase in pitch from the tip to the 25% station, corresponding to the digit number of the airfoil section in use in said channel.

7. The structure as claimed in claim 1, wherein the propeller has a different airfoil section at each station, graduating from 100%, 75%, 50% and 25% to increase the velocity of air through the channel at different positions from the channel surface to the center of the channel.

8. The structure as claimed in claim 1, wherein the propeller has a short chord at the 100% station, and a graduation to a long chord at the 25% station to facilitate the handling of high velocity air at the center of the channel.

References Cited in the file of this patent
UNITED STATES PATENTS

| | | |
|---|---|---|
| 2,532,482 | Custer | Dec. 5, 1950 |
| 2,721,045 | Custer | Oct. 18, 1955 |
| 2,937,823 | Fletcher | May 24, 1960 |